United States Patent
Sandberg et al.

(10) Patent No.: US 6,888,448 B2
(45) Date of Patent: May 3, 2005

(54) ENGINE SPEED INDICATOR FOR A VEHICLE

(75) Inventors: Tony Sandberg, Strangnas (SE); Roger Hälleberg, Nacka (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/477,934

(22) PCT Filed: May 16, 2002

(86) PCT No.: PCT/SE02/00938
§ 371 (c)(1),
(2), (4) Date: Nov. 14, 2003

(87) PCT Pub. No.: WO02/092394
PCT Pub. Date: Nov. 21, 2002

(65) Prior Publication Data
US 2004/0145461 A1 Jul. 29, 2004

(30) Foreign Application Priority Data
May 17, 2001 (SE) .............................. 0101742

(51) Int. Cl.⁷ .............................................. B60Q 1/00
(52) U.S. Cl. ..................... 340/441; 340/439; 340/438
(58) Field of Search ................. 340/439–441, 340/461, 438–462, 815.43, 815.65, 815.78; 73/113, 114; 123/339.12, 669; 116/334, 303, 62.4; 324/160, 161, 169

(56) References Cited

U.S. PATENT DOCUMENTS

| | | | |
|---|---|---|---|
| 4,016,536 A | * | 4/1977 | La Chapelle ............... 340/441 |
| 4,244,210 A | | 1/1981 | Prohaska et al. |
| 4,523,457 A | | 6/1985 | Siegfried |
| 4,633,803 A | | 1/1987 | Flowers |
| 5,040,117 A | | 8/1991 | Shyu et al. |
| 5,269,187 A | * | 12/1993 | Hanson ....................... 73/495 |
| 6,137,399 A | * | 10/2000 | Westberg et al. ........... 340/441 |
| 6,310,544 B1 | * | 10/2001 | Cohen ........................ 340/438 |
| 6,320,500 B1 | * | 11/2001 | Adelsson et al. ........... 340/441 |
| 6,480,106 B1 | * | 11/2002 | Crombez et al. ........... 340/461 |

FOREIGN PATENT DOCUMENTS

| | | |
|---|---|---|
| DE | 2 448 364 | 4/1976 |
| DE | 2 721 359 | 3/1979 |
| DE | 1 962 1 896 | 12/1997 |
| EP | 00 24568 | 3/1981 |
| JP | 80 77408 | 3/1996 |
| JP | 2000 264093 | 9/2000 |

OTHER PUBLICATIONS

International Search Report

* cited by examiner

Primary Examiner—Anh V. La
(74) Attorney, Agent, or Firm—Ostrolenk, Faber, Gerb & Soffen, LLP

(57) ABSTRACT

The present invention relates to an engine speed indicator for a vehicle, which is driven by a combustion engine. The engine speed indicator comprises a first indicator arranged to show the actual member of revolutions of the engine and second indicator arranged to show at which number of revolutions or within which range of number of revolutions a minimal emission of at least one emission gas is obtained from the vehicle during operation of the combustion engine. The engine speed indicator also comprises a third indicator which is arranged to show an emission level of the emission gas at the actual value of the number of revolutions. A driver can hereby drive the vehicle in such a manner that the emissions of emission gases are substantially minimal.

12 Claims, 2 Drawing Sheets

ENGINE SPEED INDICATOR FOR A VEHICLE

BACKGROUND OF THE INVENTION AND PRIOR ART

Figure 1:
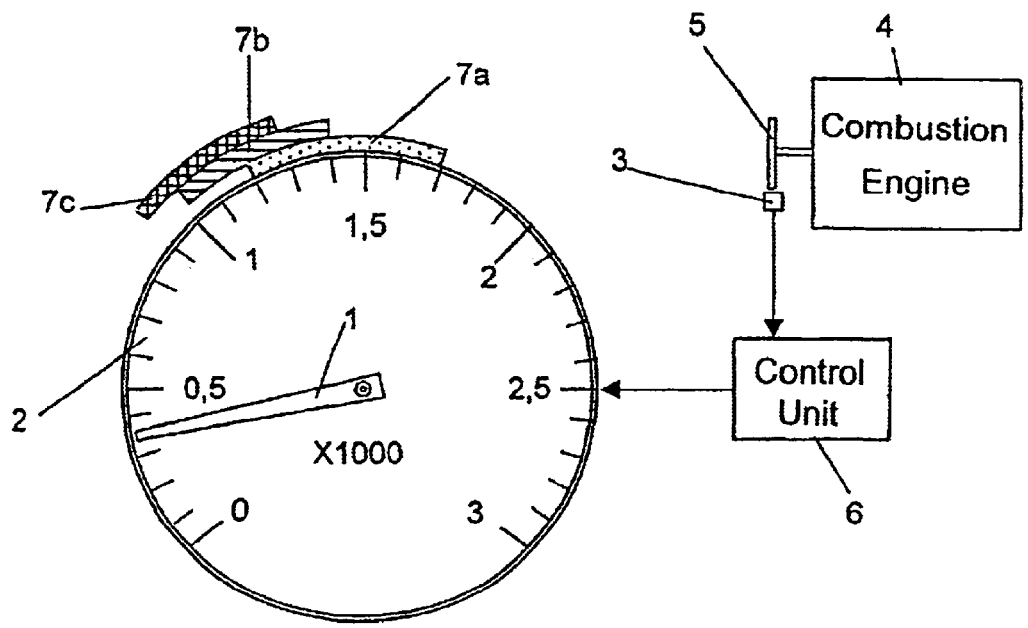

The invention relates to an engine speed indicator for a vehicle, particularly to show an engine speed at which the engine emits a minimal amount of an emission gas.

The emission of different emission gases from an engine varies principally with the engine speed but the emission quantity also varies with other factors such as the delivered engine power. In Otto cycle engines, emission gases such as carbon dioxide, water, carbon monoxide, uncombusted hydrocarbons and nitrogen oxides are created during the combustion. In diesel engines, also sulphur oxides and carbon particles are created in addition to the above mentioned emission gases. For environmental reasons, it is important that vehicles are driven such the emissions of such more or less unhealthy emission gases are reduced as far as possible. The emission quantity of different emission gases of a vehicle varies with the specific properties of the combustion engine but also with the properties of the exhaust gas filter system. Therefore, the emission quantities of the emission gases may vary considerably between different vehicles. For. this reason, it is difficult for a driver to drive a vehicle such that the emission of the emission gases is reduced substantially optimally.

U.S. Pat. Nos. 4,244,210, 4,523,457 and DE 19621896 show engine speed indicators in vehicles, which comprise different kinds of indicating means, intended to indicate an engine speed at which a minimal fuel consumption is obtained. A number of emission gases are created in a quantity, which is substantially proportional to the fuel consumption. For example, carbon dioxide is created in a quantity, which is substantially proportional to the fuel consumption. Most emission gases are created in a quantity, which is related to different operation conditions. For example, the creation of carbon monoxide and nitrogen oxides is promoted. when a local lack of oxygen is the case, the creation of hydrocarbons when a high temperature and an oxygen surplus are the case and the creation of visible smoke (carbon particles) of diesel engines when the engine power is high and when the oxygen surplus is insufficient The emissions of these emission gases may be minimal at engine speeds, which considerably differ from the engine speed where the fuel consumption is minimal.

SUMMARY OF THE INVENTION

The object of the present invention is to provide an engine speed indicator having a design such it in an illustrative and simple manner indicates to a driver of the vehicle recommended operation condition where the emission of at least one emission gas is at a minimal level. Thereby, the driver has the possibility to drive the vehicle in a manner such that the emission of the emission gas is substantially minimal.

The above mentioned object is achieved by the initially mentioned engine speed indicator for a vehicle, which is driven by a combustion engine. The engine speed indicator comprises first indicating means arranged to show the actual number of revolutions of the engine and second indicating means arranged to show at which number of revolutions or within which range of number of revolutions a minimal emission of at least one emission gas is obtained from the vehicle during operation of the combustion engine. The engine speed indicator also comprises third indicating means which is arranged to show an emission level of emission gas at the actual value of the number of revolutions. A driver can hereby drive the vehicle in such a manner that the emissions of emission eases are substantially minimal. The quality of the emission gas, which is created during the combustion process in a combustion engine, is principally related to the engine speed. Thereby, it is possible to indicate a number of revolutions or a range of number of revolutions with a relatively high accuracy at which the emission of an emission gas is substantially minimal. Such a number of revolutions or range of number of revolutions may be based on measures performed on the vehicle in question or on a vehicle with a corresponding type of engine and a corresponding exhaust gas filter system. Advantageously, the second indicating means provides a clear indication of such number of revolutions or range of number of revolutions for several different emission gases Alternatively, a number of revolutions or a range or revolutions may be indicated at which a total weighted minimal emission of several emission gases is obtained. Such a number of revolutions or range of number of revolutions may be weighted dependent of the danger of the different emission gases. Consequently, in order to estimate the emission of different emission gases from a vehicle the ability of the exhaust gas filter system to eliminate different emission gases must also be taken into consideration. The second indicating means ought to have such a design that the driver without losing his attention to the surrounding traffic perceives the recommended engine speed at which the vehicle is driven with a minimal emission of emission gases. Consequently, the engine speed indicator indicates by said first and second means a difference between the actual engine speed and a recommended engine speed. With knowledge of said difference in engine speed, the driver has the possibility to adjust the driving of the vehicle such that said difference is reduced. Preferably, the difference is reduced in that the driver engages a new gear in the gearbox, which gives an engine speed, which better corresponds the recommended number of revolutions. Advantageously, also automatic gearboxes may be controlled in a corresponding manner such that a gear change the whole time is obtained which gives a minimal emission of emission gases.

According to a preferred embodiment of the present invention, the engine speed indicator comprises a third indicating means which is arranged to indicate an emission level of said emission gas at the actual number of revolutions. With a knowledge of the actual emission level and the minimal emission level, the driver here obtains an idea about how much the emission of said emission gas may be reduced if the driving of the vehicle is adjusted such that the recommended number of revolutions is achieved. Consequently, in the cases where only a small reduction of the emission level of the emission gas is obtained, it is not as important to change the vehicle as in the cases when a larger reduction is obtained.

According to a preferred embodiment of the present invention, said first indicating means comprises a movably arranged indicating member which is arranged to show the actual value of the engine speed. Many conventional engine speed indicators comprise a pivotally arranged pointer the outer end which points on the actual value of the number of revolutions which is marked along a circular path. According to an alternative, said second indicating means may comprise at least one indicating member which is permanently arranged along said path, which indicating member shows at which number of revolutions or within which range of number of revolutions a minimal emission of at least one emission gas is obtained. For example, the indicating member may comprise a suitably colored path with an extension along the range of the revolutions where a minimal emission of an emission gas is obtained. Advantageously, several such indicating members are arranged in order to indicate suitable ranges of number of revolutions for different emission gases. A driver observes, with such permanent indicating members, in a simple manner if the vehicle is driven with an engine speed within the range of number of revolutions recommended by the indicating member.

According to another preferred embodiment of the present invention, said third indicating means comprises at least one light generating member which through the generation of light of different colors indicates the emission level of said emission gas at the actual engine speed. For example, a green light may be emitted when the emission level is satisfactory, a yellow light, when it is not completely satisfactory, and a red light, when it is unacceptably high. Thereby, the driver obtains a simple and clear indication of the emission level of said emission gas. Advantageously, said light generating member is a light emitting diode. A light emitting diode may comprise a semiconductor material such that the light emitting diode emits light with different colors when current flows through the semiconductor material. For example, a light emitting diode comprising the semiconductor material gallium phosphide may emit red, green and yellow light.

According to another preferred embodiment of the present invention, a control unit is arranged to receive information concerning the engine speed and the delivered engine power, after which the control unit is arranged to activate the second indicating means such it shows at which number of revolutions or within which range of number of revolutions a minimal emission of said emission gas is obtained at the actual engine power. The delivered engine power may for example be estimated with knowledge of the fuel consumption. With knowledge of the fuel consumption of the engine, the delivered engine power may be estimated by means of stored measured values for the actual type of engine. Alternatively, the engine power may be determined by measuring suitable parameters. For example, this may be performed by means of torque sensors, which measure the actual torque in a portion of the drive train of the vehicle. With knowledge of the measured torque, the engine power may be determined. Since consideration here also is taken to the actual delivered engine power, the range of number of revolutions at which a minimal emission of said emission gas is obtained may be determined with a high accuracy. Preferably, the control unit is also arranged to initiate the activation of said third indication means in order to indicate an emission level of said emission gas. The control unit takes here into consideration both the engine speed and the delivered engine power, which has as a result that the emission level of said emission gas may be determined with a high accuracy.

According to another preferred embodiment of the present invention, the engine speed indicator comprises a display having an image surface and a first indicating means in the form of a pointer the position of which on said image surface indicates the actual engine speed and the delivered engine power. The driver may here in a simple and visible manner, via the position of the pointer, be informed about the actual engine speed and delivered engine power. Advantageously, said display comprises second means in the form of a graph which shows at which number of revolutions or within which range of number of revolutions a minimal emission level of said emission gas is obtained. The distance between the position of the pointer and the graph illustrates in a clear manner on the image surface how wrong the actual engine speed is in relation to the recommended. The extension of the graph shows at which number of revolutions as a function of delivered engine power a minimal emission of said emission gas is obtained. If the vehicle is driven in a manner such that the pointer has a position at a relatively large distance from the graph, this is a clear indication to the driver that a new gear ought to be engaged in the gear box. Preferably, said display comprises third indicating means in the form of at least a contour line which connects power ranges with a specific emission level of said emission gas. Preferably, several such contour lines are marked for different specific emission levels such that the driver is informed with a relative large accuracy about the difference between the actual emission level shown by the pointer and the minimal emission level shown by the graph. The more contour lines that are located between the pointer and the graph shows how much the emission of said emission gas may be reduced by the engagement of a more suitable gear.

SHORT DESCRIPTION OF THE DRAWINGS

Figure 2:
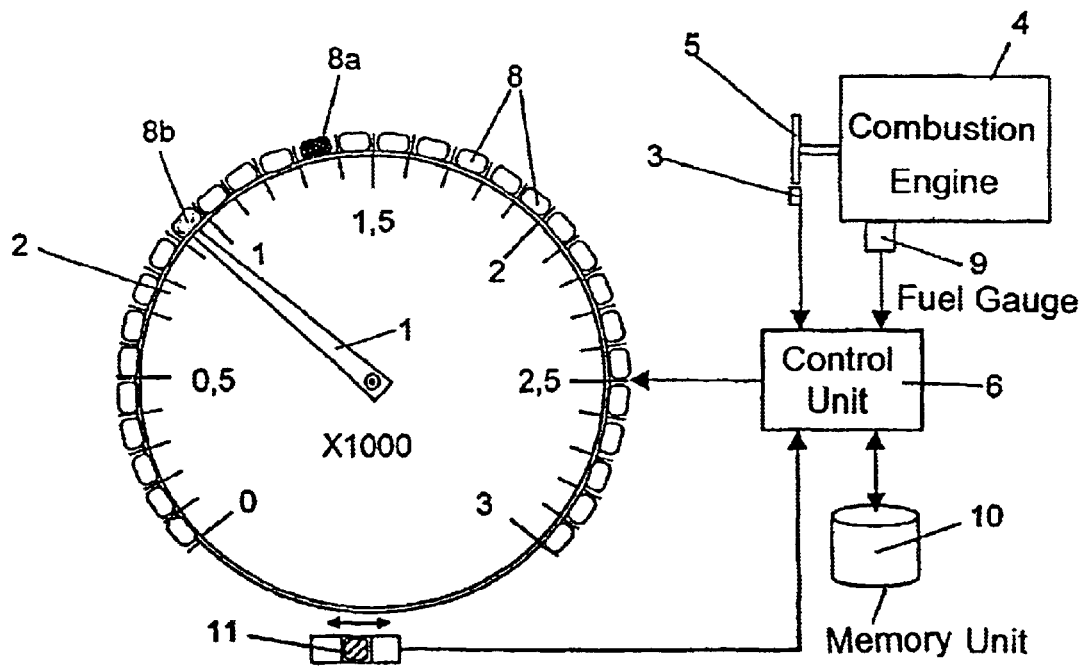
Figure 3:
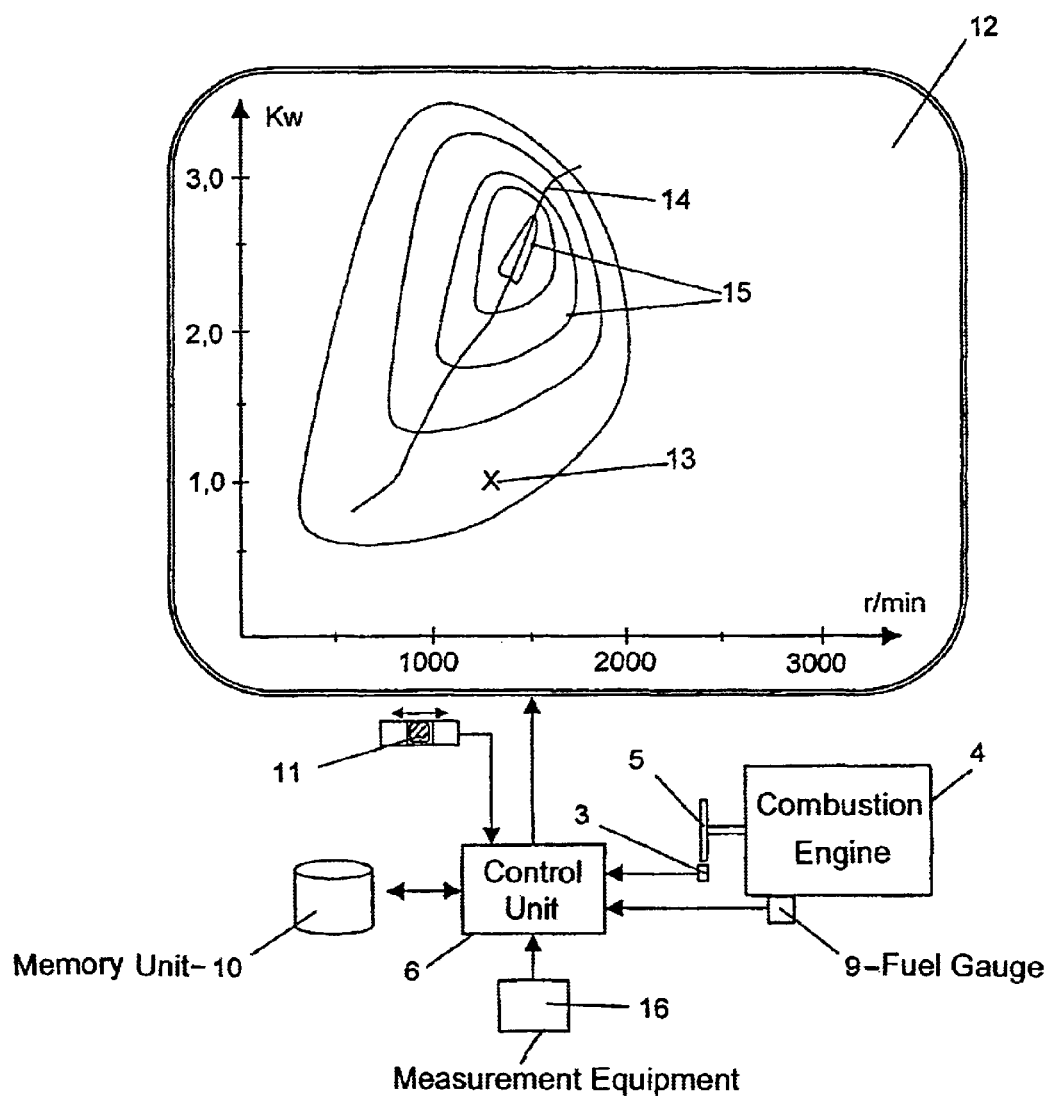

In the following preferred embodiments of the invention are shown as examples with reference to the attached drawings, in which:

FIG. 1 shows an engine speed indicator according to a first embodiment of the present invention, FIG. 2 shows an engine speed indicator according to a second embodiment of the present invention, FIG. 3 shows an engine speed indicator according to a third embodiment of the present invention.

DETAILED DESCRIPTION OF PREFERRED EMBODIMENTS OF THE INVENTION

FIG. 1 shows an engine speed indicator having a conventional basic construction. The engine speed indicator comprises a pointer 1 having an inner end portion which is pivotally connected to a central pant of the engine speed indicator and an outer end portion which is movably arranged along a circular path 2 in order to indicate the value of the number of revolutions. The circular path 2 comprises indications, which indicate the value of the engine speed. A sensor 3 is arranged to measure the number of revolutions of a combustion engine 4. The sensor 3 is, for example, a tachometer, which measures the number of revolutions of a flywheel 5, which is fixedly connected to the crankshaft of the engine 4. The sensor 3 emits a signal, which corresponds to the value of the number of revolutions to a control unit 6. The control unit 6 initiates a pivotal motion of the pointer 1 to a position, which corresponds to the number of revolutions measured by the sensor 3. The engine speed indicator also comprises three indicating members 7a–c provided substantially in parallel, which have an extension along a part of the path 2. The indicating members 7a–c symbolize three different emission gases. The extension of the indicating members 7a–c along the path 2 shows the range of number of revolutions within which the combustion engine 4 emits a minimal quantity of the respective emission gases. For example, the indicating member 7a indicates within which range of number of revolutions the quantity of emitted uncombusted hydrocarbons is minimal, the indicating member 7b indicates within which range of number of revolutions the quantity of emitted carbon monoxide is minimal and the indicating member 7c indicates within which range of number of revolutions the quantity of emitted nitrogen oxides is minimal. Consequently, in this case it is suitable to drive the vehicle within an engine speed between 1200–1300 r/min in order to minimize the emission of the three above mentioned emission gases. The emissions of the above-mentioned emissions gases vary with the specific properties of the engine and also with the kind of exhaust gas filter system used. Corresponding indicating members 7a–c in another vehicle may therefore show other ranges of revolutions where a minimal emission of said emission gases is obtained.

FIG. 2 shows an engine speed indicator provided with a plurality of light emitting diodes 8 arranged in a row along said path 2. Each light emitting diode 8 symbolizes thereby a small range of number of revolutions. The light emitting diodes 8 comprise a semiconductor material such that they may emit three different colors namely, green, yellow and red. In a corresponding way as in the embodiment in FIG. 1, a sensor 3 here measures the number of revolutions of the combustion engine 4. The sensor 3 emits a signal, which corresponds to the value of the number of revolutions to a control unit 6. The control unit 6 initiates a pivotal motion of the pointer 1 to a position, which corresponds the number of revolutions, measured by the sensor 3. The control unit 6 here also obtains information from a fuel gauge 9, which measures the supplied fuel quantity to the combustion engine 4. With knowledge of the supplied fuel quantity and data stored in a memory unit 10 concerning the specific properties of the engine 4, the control unit 6 determines a value of the delivered power of the engine 4 for driving of the vehicle. By means of stored data in the memory unit 10, the control unit also determines within which range of number of revolutions a minimal emission is obtained of an emission gas at the delivered engine power. Since the emission quantity of an emission gas varies with the engine power, a determination is here obtained of said range of number of revolutions with an increased accuracy in relation to when consideration is taken only to the engine speed. The control unit 6 initiates activation of the light emitting diode 8a, which corresponds to the number of revolutions where a minimal emission is obtained. The light emitting diode 8a emits here a green light. The control unit also initiates activation of the light emitting diode 8b, which corresponds to the actual number of revolutions. The light emitting diode 8b emits here a green light in case the emission level of the shown emission gas substantially corresponds to the minimal emission level, a yellow light when the emission level is not completely satisfactory and a red light when the emission level is unacceptably high. The driver obtains here a clear indication by means of the color of the light emitting diode 8b if a new gear ought to be engaged in order to decrease the emission of the emission gas. The engine speed indicator comprises a switch member 11, which is settable in different positions in order to allow for switching between different kinds of emission gases. If the switch member 11 is set in a first position, the emissions quantity of uncombusted hydrocarbons is shown, in a second position the emission quantity of carbon dioxide and in a third position the emission quantity of nitrogen oxides.

FIG. 3 shows a display 12 having an image surface. The image surface comprises a vertical axis, which indicates delivered engine power and a horizontal axis which indicates the engine speed. A pointer 13 is arranged to take a position on the image surface, which informs the driver about the actual engine speed and delivered engine power. A graph 14 extends over the image surface. The graph 14 shows the engine speed as a function of delivered engine power at which a minimal emission is obtained of an emission gas. A plurality of contour lines 15 connect different power ranges with equal emission levels of said emission gas. The contour lines 15 create closed loops along which a substantially constant emission level of an emission gas is obtained. The contour line 15, which forms the innermost closed loop, contains a power range at which the lowest emission level of the emission gas is obtained. The contour lines 15, which extend around the innermost loop, show one for each loop increased emission level. In a corresponding way as in the embodiments in the FIGS. 1 and 2, a sensor 3 measures the number of revolutions of a combustion engine 4. The sensor 3 emits a signal, which corresponds to the value of the number of revolutions to a control unit 6. The control unit 6 also receives information from a fuel gauge 9, which measures the quantity of fuel supplied to the combustion engine 4. With knowledge of the supplied fuel quantity and stored data in a memory unit 10 concerning the specific properties of the used combustion engine 4, the control unit 6 determines a value of the power delivered by the engine 4. The control unit 6 initiates a positioning of a pointer 13 on the display 12, which informs the driver about the actual engine speed and delivered engine power. The engine speed indicator comprises also here a switch member 11, which is settable in different positions in order to allow for switching between different kinds of emission gases. If the emission gas hydrocarbons is chosen to be shown on the display 12, a graph 14 is shown where a minimal emission of hydrocarbons is obtained. Furthermore, the contour lines 15 indicate on the display power ranges with equal emission levels of hydrocarbons. In order to obtain a minimal emission of an emission gas, a driver ought to try to drive the vehicle such that the pointer 13 is as close to the graph 14 as possible. In order to decrease the distance between the pointer 13 and the graph 14, in the example shown in FIG. 3, the driver preferably engages a lower gear in the gear box such that the distance between the pointer 13 and the graph 14 decreases. However, in this case it is not absolutely necessary to change gear since no contour line 15 extends between the pointer 13 and the graph 14. The emission quantity of the emission gas may here only be reduced moderately by changing down the vehicle.

FIG. 3 also schematically shows measurement equipment 16, which is arranged to measure the emission quantities of different emission gases from the vehicle. The control unit 16 receives information concerning the emitted quantity of said emission gases and stores these values together with values concerning the engine speed and engine power. If differences exist between earlier stored values and measured values, the stored values in the memory unit 10 are corrected. Consequently, in this case the control unit 6 may use measured actual values for the specific vehicle.

The invention is not in any way restricted to the above-described embodiments but may be varied freely within the scope of the claims.

What is claimed is:

1. An engine speed indicator for a vehicle combustion engine, the indicator comprising:
    a first indicator in communication with the engine and arranged to show an actual number of revolutions of the engine, and
    a second indicator operative to show at which number of revolutions or within which range of number of revolutions a minimal emission of at least one emission gas is obtained from a vehicle during operation of the combustion engine thereof.

2. An engine speed indicator according to claim 1, further comprising a third indicator operative to show an emission level of the emission gas at the actual number of revolutions.

3. An engine speed indicator according to claim 1, wherein the first indicator comprises a first indicating member operative to show the value of the actual number of revolutions by movement of the first indicating member along a graduated path.

4. An engine speed indicator according to claim 3, wherein the second indicator comprises a second indicating member, which is permanently positioned along the graduated path, at a location which shows at which number of revolutions or within which range of number of revolutions a minimal emission of the emission gas is obtained.

5. An engine speed indicator according claim 4, further comprising a third indicator operative to show an emission level of the emission gas at the actual number of revolutions; wherein the third indicator comprises at least one light generating member positioned and operative to indicate the emission level of the emission gas at the actual number of revolutions by means of different colors.

6. An engine speed indicator according to claim 5, wherein the light generating member comprises a light emitting diode.

7. An engine speed indicator according to claim 1, further comprising a control unit arranged and operative to receive information concerning the number of revolutions of the engine and the delivered engine power, and the control unit is operative to activate the second indicator to show at which number of revolutions or within which range of number of revolutions a minimal emission of the emission gas is obtained at the current engine power.

8. An engine speed indicator according to claim 7, further comprising a display having an image surface; and
the first indicator is in the form of a pointer the position of which on the image surface indicates the actual number of revolutions of the engine and delivered engine power.

9. An engine speed indicator according to claim 8, wherein the display comprises the second indicator having the form of a graph which shows at which number of revolutions or within which range of number of revolutions as a function of the delivered engine power a minimal emission level of the emission gas is obtained.

10. An engine speed indicator according to claim 9, wherein the display comprises at least one contour line, which connects power ranges with a specific emission level of the emission gas.

11. An engine speed indicator according to claim 2, wherein the third indicator comprises at least one light generating member positioned and operative to indicate the emission level of the emission gas at the actual number of revolutions by means of different colors.

12. An engine speed indicator according to claim 11, wherein the light generating member is a light emitting diode.

* * * * *